United States Patent
Pirzadeh

(10) Patent No.: US 11,816,048 B2
(45) Date of Patent: *Nov. 14, 2023

(54) CHIP CARD SOCKET COMMUNICATION

(71) Applicant: VISA INTERNATIONAL SERVICE ASSOCIATION, San Francisco, CA (US)

(72) Inventor: Kiushan Pirzadeh, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/953,874

(22) Filed: Sep. 27, 2022

(65) Prior Publication Data

US 2023/0025779 A1    Jan. 26, 2023

Related U.S. Application Data

(63) Continuation of application No. 16/457,345, filed on Jun. 28, 2019, now Pat. No. 11,487,681.

(Continued)

(51) Int. Cl.
*G06F 13/20* (2006.01)
*H04L 67/02* (2022.01)
*H04L 9/40* (2022.01)

(52) U.S. Cl.
CPC .............. *G06F 13/20* (2013.01); *H04L 67/02* (2013.01); *G06F 2213/0002* (2013.01)

(58) Field of Classification Search
CPC ..... H04L 63/0853; H04L 67/02; G06F 13/20; G06F 2213/0002

(Continued)

(56) References Cited

U.S. PATENT DOCUMENTS 5,374,916 A    12/1994   Chu
8,065,454 B1   11/2011   Sonksen et al.
(Continued)

FOREIGN PATENT DOCUMENTS

KR    100680288 B1    2/2007

OTHER PUBLICATIONS

Application No. EP19826030.9, Extended European Search Report, dated Aug. 11, 2021, 6 pages.

(Continued)

*Primary Examiner* — Chun Kuan Lee
(74) *Attorney, Agent, or Firm* — Kilpatrick Townsend & Stockton LLP

(57) ABSTRACT

Enhanced techniques for communicating with an integrated circuit chip card are disclosed. An integrated circuit chip card may include a processor, a memory storing a plurality applications executable by the processor, an input/output (I/O) interface, and a network interface coupled to the (I/O) interface. The network interface may implement a plurality of logical ports, and the network interface can be configurable to select between multiple communication protocols to communicate with an external device in a socket communication mode. The network interface can be configured to establish a plurality of communication channels between the external device the integrated circuit chip card using the plurality of logical ports, and each of the communication channels may support communication with one of the plurality of applications.

19 Claims, 4 Drawing Sheets

Related U.S. Application Data

(60) Provisional application No. 62/692,359, filed on Jun. 29, 2018.

(58) Field of Classification Search
USPC .......................................................... 710/313
See application file for complete search history.

(56) References Cited

U.S. PATENT DOCUMENTS

| | | |
|---|---|---|
| 2003/0226135 A1 | 12/2003 | Sethi et al. |
| 2005/0108571 A1 | 5/2005 | Lu et al. |
| 2006/0043202 A1 | 3/2006 | Kim et al. |
| 2007/0180517 A1* | 8/2007 | Rhelimi .............. G06F 21/6281 |
| | | 726/20 |
| 2007/0210174 A1 | 9/2007 | Deprun et al. |
| 2008/0017711 A1* | 1/2008 | Adams .................. G07F 7/0886 |
| | | 235/439 |
| 2008/0091878 A1 | 4/2008 | Stern et al. |
| 2008/0320187 A1 | 12/2008 | Kim et al. |
| 2009/0037890 A1 | 2/2009 | Kazmi |
| 2010/0146279 A1* | 6/2010 | Lu .......................... G06F 13/10 |
| | | 713/172 |
| 2010/0175067 A1 | 7/2010 | Appe et al. |
| 2010/0313008 A1 | 12/2010 | Spitz et al. |
| 2013/0007204 A1* | 1/2013 | Follero .................. G06F 9/541 |
| | | 709/217 |
| 2014/0081872 A1 | 3/2014 | Papagrigoriou |
| 2015/0181621 A1 | 6/2015 | Levy et al. |
| 2016/0210179 A1* | 7/2016 | Hans ...................... G06F 9/546 |
| 2017/0063548 A1 | 3/2017 | Naccache et al. |
| 2018/0349647 A1 | 12/2018 | Morgner et al. |

OTHER PUBLICATIONS

Application No. EP19826030.9 , Office Action, dated Jul. 20, 2022, 7 pages.
Application No. PCT/US2019/039928 , International Preliminary Report on Patentability, dated Jan. 7, 2021, 8 pages.
Application No. PCT/US2019/039928 , International Search Report and Written Opinion, dated Dec. 9, 2019, 11 pages.
Wolfgang et al., "Smart Card Handbook", Fourth Edition, ISBN: 978-0-470-74367-6, Jul. 19, 2010, 57 pages.
Application No. SG11202012477P, Written Opinion, dated Sep. 23, 2022, 6 pages.

* cited by examiner

CHIP CARD SOCKET COMMUNICATION

CROSS REFERENCE TO RELATED APPLICATIONS

This application is a continuation application of U.S. application Ser. No. 16/457,345, filed on Jun. 28, 2019, which claims the benefit of the filing date of U.S. Provisional Application No. 62/692,359, filed on Jun. 29, 2018, and are incorporated by reference herein in their entirety for all purposes.

BACKGROUND

Communication with chip cards such as secure elements and subscriber identity modules (SIMs) used in mobile devices, identification smart cards, financial smart cards, or other integrated circuit chip cards compliant with ISO 7816 and/or ISO 14443 is typically carried out using a protocol known as application protocol data unit (APDU). The APDU protocol provides commands sent from a card reader to a chip card, and provides responses send from the chip card to the card reader. The APDU commands and responses are transmitted serially through a contact or contactless interface on the chip card. Although multiple applications may reside on the chip card, only one application can establish a communication channel between the chip card and the card reader. Furthermore, current chip cards lack native support for communicating with a network such as the Internet.

Embodiments of the present invention address these and other problems individually and collectively.

BRIEF SUMMARY

Enhanced techniques for communicating with an integrated circuit chip card or smart card are disclosed. An integrated circuit chip card may include a processor, a memory storing a plurality applications executable by the processor, an input/output (I/O) interface, and a network interface coupled to the (I/O) interface. The network interface may implement a plurality of logical ports, and the network interface can be configurable to select between multiple communication protocols to communicate with an external device in a socket communication mode. The network interface can be configured to establish a plurality of communication channels between the external device the integrated circuit chip card using the plurality of logical ports, and each of the communication channels may support communication with one of the plurality of applications.

A process for communicating with an integrated circuit chip card or smart card may include receiving, by the integrated circuit chip card, a signal from an external device indicative of a communication mode used by the external device. The process may further include determining that the communication mode is a socket communication mode. The network interface of the integrated circuit chip card can then be configured in a socket communication mode capable of establishing multiple communication channels over multiple logical ports to communicate with multiple applications installed on the integrated circuit chip card.

Further details regarding embodiments of the invention can be found in the Detailed Description and the Figures.

DETAILED DESCRIPTION

Figure 1:
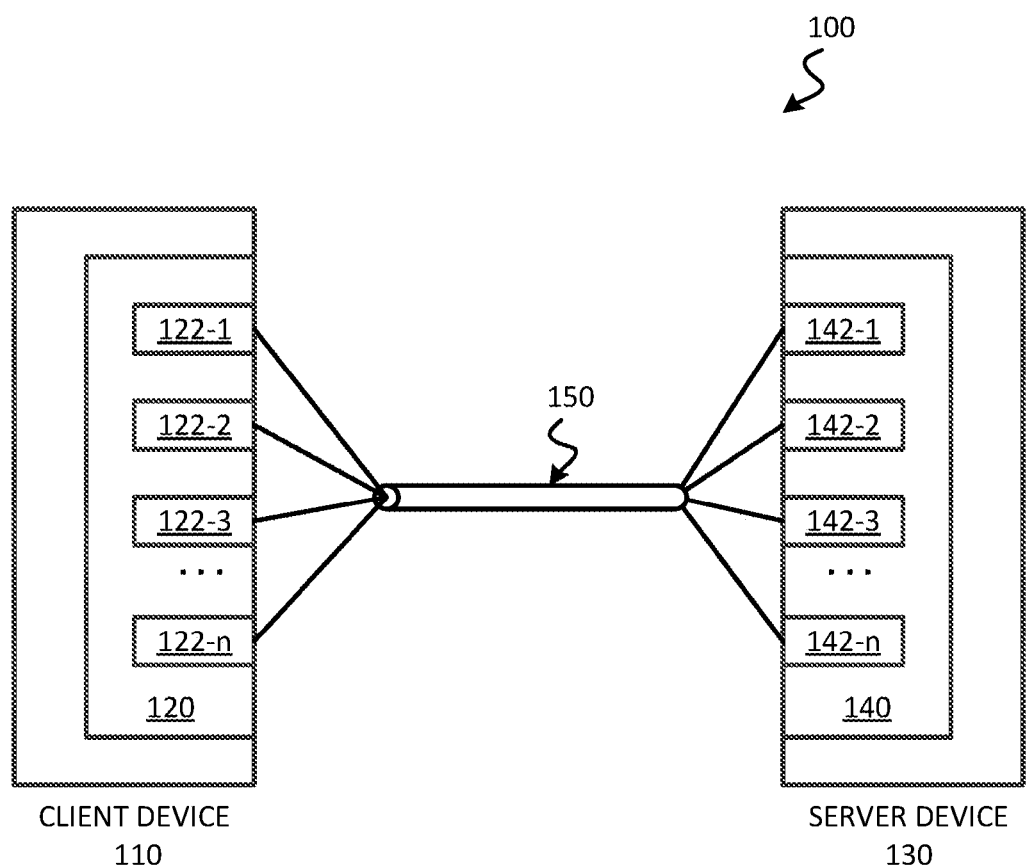
FIG. 1 illustrates a conceptual diagram of socket communication, according to some embodiments.

Prior to discussing embodiments of the invention, some terms can be described in further detail.

A "socket" can include an endpoint for sending or receiving data. In practice socket usually refers to a socket in an Internet Protocol (IP) network (where a socket may be called an Internet socket), in particular for the Transmission Control Protocol (TCP), which is a protocol for one-to-one connections. In this context, sockets can be associated with a specific socket address, namely the IP address and a port number. In the standard Internet protocols TCP and UDP, a socket address can be the combination of an IP address and a port number. A socket can comprise a number of logical ports.

A "logical port" can include a communication port providing means of internal addressing to a machine. A logical port can act as a virtual communication channel. Logical ports can be a part of TCP/IP networking. Logical ports can allow software applications to share hardware resources without interfering with one another other. Devices can manage communication traffic traveling via their virtual ports. Network firewalls may additionally provide some control over the flow of traffic on each logical port for security purposes.

A "physical port" can include a physical communication port for a machine. A physical port can act as a physical communication channel. Physical network ports can provide wired connectivity to computers, routers, modems and other peripheral devices. Several different types of physical ports can be available on computer network hardware. A physical port, as opposed to a virtual or logical port is an interface on a computer into which you can insert a connector for a device. Examples of a physical port can include RJ45 port (Ethernet/LAN/NIC Port), Serial Port (RS-232), USB Port, contact chip, etc. A physical port can also be associated with a transceiver to provide wireless or contactless connectivity.

An "application" can include a program and/or piece of software capable of fulfilling a particular purpose.

An "integrated circuit chip card" can include a physical electronic authorization device. An integrated circuit chip card can be used to control access to a resource. In some embodiments, an integrated circuit chip card can include a card substrate with an embedded integrated circuit. In some implementations, the integrated circuit chip card can have a form factor of a wallet-sized card or smaller (e.g., a SIM card). An integrated circuit chip card can provide personal identification, authentication, data storage, and application processing capabilities. The integrated circuit chip card can store any suitable applications (e.g., identification applications, transit applications, interaction applications, security applications, location access applications, etc.).

A "signal" can include an electrical impulse or radio wave transmitted or received.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment.

An "access device" can include any suitable device that provides access to a remote system. An access device may also be used for communicating with a resource provider computer, a network processing computer, an authorization computer, or any other suitable system. An access device may generally be located in any suitable location, such as at the location of a merchant. An access device may be in any suitable form. Some examples of access devices include POS or point of sale devices (e.g., POS terminals), cellular phones, PDAs, personal computers (PCs), tablet PCs, handheld specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, an integrated circuit chip card. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with an integrated circuit chip card. In some embodiments, a cellular phone, tablet, or other dedicated wireless device used as a POS terminal may be referred to as a mobile point of sale or an "mPOS" terminal.

A "resource provider" may be an entity that can provide a resource such as goods, services, information, and/or access. Examples of resource providers includes merchants, data providers, transit agencies, governmental entities, venue and dwelling operators, etc.

"Access data" may include any suitable data that can be used to access a resource or create data that can access a resource. In some embodiments, access data may be account information for a payment account. Account information may include a PAN, payment token, expiration date, verification values (e.g., CVV, CVV2, dCVV, dCVV2), etc. In other embodiments, access data may be data that can be used to activate account data. For example, in some cases, account information may be stored on a mobile device, but may not be activated until specific information is received by the mobile device. This specific information may be characterized as access information in some embodiments. In other embodiments, access data could include data that can be used to access a location. Such information may be ticket information for an event, data to access a building, transit ticket information, etc. Access data may include real access data (e.g., a real credit card number or real access credentials to enter a building), or tokenized access data (e.g., data that represents or obscures the real credit card number or real access credentials).

A "credential" may include any suitable information that serves as reliable evidence of worth, ownership, identity, or authority. A credential may be a string of numbers, letters, or any other suitable characters that may be present or contained in any object or document that can serve as confirmation. Examples of credentials include payment credentials, cryptograms, access credentials, and any other suitable type of credentials.

An "authorization request message" may be an electronic message that requests authorization for an interaction. In some embodiments, it is sent to a transaction processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues, and optionally maintains, an account for a user. An issuer may also issue payment credentials stored on a user device, such as a cellular telephone, integrated circuit chip card, tablet, or laptop to the consumer, or in some embodiments, a portable device.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments of the invention allow for an integrated circuit chip card comprising. The integrated circuit chip card can comprise a processor, a memory, an input/output interface, and a network interface. The memory can store a plurality of applications executable by the processor. The network interface can be coupled to the input/output interface and can implement a plurality of logical ports to communicate with an external device in a socket communication mode. The network interface can be configurable to select between multiple communication protocols to communicate with the external device and is capable of establishing a plurality of communication channels between the external device the integrated circuit chip card using the plurality of logical ports. Each of the communication channels can be capable of communicating with one of the plurality of applications.

As an illustrative example, an integrated circuit chip card can receive a signal from an external device (e.g., an access device) indicative of a communication mode used by the external device. After receiving the signal, the integrated circuit chip card can determine that the communication mode is a socket communication mode. The integrated circuit chip card can then configure a network interface of the integrated circuit chip card in the socket communication mode capable of establishing a plurality of communication channels over a plurality of logical ports to communicate with a plurality of applications installed on the integrated circuit chip card.

I. Systems

FIG. 1 illustrates a conceptual diagram of socket communication, according to some embodiments. System 100 can include client device 110 and server device 130. Client device 110 can include, for example, an access device. Server device 130 can include, for example, an integrated circuit chip card.

Client device 110 may include a network interface 120 that can implement multiple logical ports 122-1 to 122-n. Network interface 120 can include an interface that can allow the client device 110 to communicate with external devices. The network interface 120 may enable the client device 110 to communicate data to and from another device (e.g., server device 130, etc.). Some examples of the network interface 120 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 120 may include Wi-Fi™. Data transferred via the network interface 120 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 120 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Logical ports 122-1 to 122-n can act as virtual communication channels, and can be mapped to one or more physical ports of client device 110. A logical port can be a communication port. A socket of the client device can include logical ports 122-1 to 122-n. In some embodiments, the network interface 120 can implement any suitable number of logical ports (e.g., 1, 2, 5, 10, etc. logical ports). A physical port can include, for example, one or more electrical contacts and/or one or more radio frequency transceivers.

The server device 130 can include a network interface 140 that can implement multiple logical ports 142-1 to 142-n. The network interface 140 can be similar to the network interface 120 of the client device 110. Logical ports 142-1 to 142-n also act as virtual communication channels, and can be mapped to one or more physical ports of server device 130. For example, logical ports 142-1 to 142-n can be logical ports related to TCP/IP networking. In some embodiments, the logical ports can be mapped to one or more physical ports including a radio frequency transceiver and an electrical contact. A first logical port can be mapped to the radio transceiver, while a second logical port can be mapped to the electrical contact. In other embodiments, the first logical port and the second logical port can both be mapped to the radio transceiver and the electrical contact.

Client device 110 may communicate with server device 130 to exchange data or other information via a communication link 150. Communication link 150 can be a wired link or a wireless link, and may connect a physical port of client device 110 to a physical port of server device 130. For example, communication link 150 can connect the electrical contact of server device 130 and the electrical contact of client device 110. For example, server device 130 may include an integrated circuit chip card, and client device 110 may include a card reader of a point-of-sale terminal. The card reader can communicate with the integrated circuit chip card via communication link 150.

The communication between client device 110 and server device 130 can be referred to as socket communication because each port can act as a network node to establish a communication channel, and multiple communication channels can be implemented over a physical wired or wireless connection. In some embodiments, the logical ports can be used to implement TCP/IP sockets or other network communication protocol sockets. Socket-based communication can be advantageous as it can be independent of programming language and operating system. As such, applications of client device 110 and server device 130 need not be written in the same language. Socket-based communication further allows for distributing client device 110 and server device 130 in separate systems.

In some embodiments, the socket-based communication system can allow for server device 130 to be an integrated circuit chip card and client device 110 to be an access device (e.g., a point-of-sale terminal, transit terminal, an automated teller machine, the mobile device (e.g., a smart phone) that the chip card has been inserted into, etc.). In some embodiments, client device 110 can also be a computer. For example, the computer, acting as client device 110, may implement one or more integrated circuit chip card tools such as a terminal simulator, an APDU generator, a Java virtual machine, a provisioning tool (e.g., a card applet loader or a card personalization tool, etc.), etc. In some embodiments, for example in a testing or development environment or otherwise, server device 130 can include a card simulation or a card runtime environment (e.g., Java) executing on a computing device.

Figure 2:
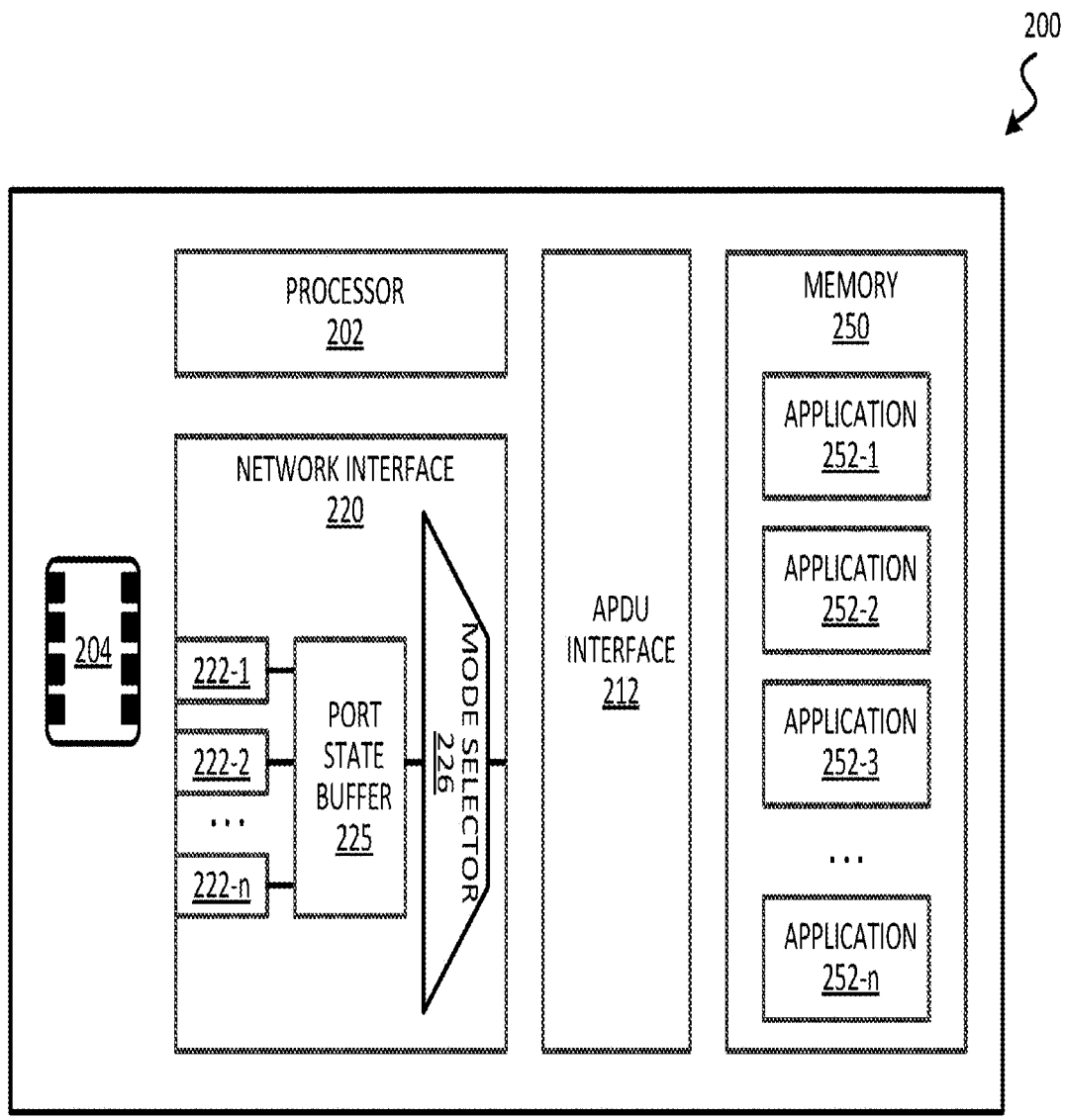
FIG. 2 illustrates a block diagram of an integrated circuit chip card, according to some embodiments.

FIG. 2 illustrates a block diagram of an integrated circuit chip card 200 that can act as a server device (e.g., server device 130), according to some embodiments. Integrated circuit chip card 200 may include a processor 202 and a memory 250 storing a plurality of applications (e.g., first application 252-1, second application 252-2, third application 252-3, and Nth application 252-n) executable by the processor 202. Integrated circuit chip card 200 can further include input/output (I/O) interface 204, APDU interface 212, and network interface 220.

Processor 202 can be implemented as one or more integrated circuits (e.g., one or more single core or multicore microprocessors and/or microcontrollers), and is used to control the operation of integrated circuit chip card 200. Processor 202 can execute a variety of applications using the application code or computer-readable code stored in memory 250, and may maintain multiple concurrently executing applications or processes in some embodiments.

Memory 250 can be implemented using any combination of any number of non-volatile memories (e.g., flash memory, EEPROM) and volatile memories (e.g., DRAM, SRAM), or other suitable non-transitory storage medium, or a combination thereof media. Memory 250 may store various applications 252-1 to 252-n that can be selected by an access device (e.g., a card reader or other client) for data exchange. Examples of such applications may include mobile wallet applications, interaction applications, resource provider applications, identification applications, etc. An interaction application can include transit applications, secure location access applications, payment applications, and/or any other suitable application facilitating in an interaction between two entities (e.g., a user and a resource provider). In some embodiments, an interaction application can be provisioned by an authorizing entity. As an illustrative example, the memory 250 can store two applications. A first application can be a transit application and a second application can be a payment application. The transit application can allow a user of integrated circuit chip card 200 to gain access to a transit system (e.g., a train station, a bus, etc.). The payment application can allow a user of integrated circuit chip card 200 to gain access to a resource (e.g., goods and/or services purchased using the payment application).

In some embodiments, the server device can include a card simulation or a card runtime environment executing on the server device or other computing device). The server device can be a mobile phone that includes a mobile OS that may implement a set of card emulation APIs that can be invoked by a mobile application, stored in memory 250, to access a contactless interface to interact with the client device (e.g., an access device).

Integrated circuit chip card 200 may include an input/output (I/O) interface 204. In some embodiments, I/O interface 204 may include a set of one or more electrical contacts, and can be ISO 7816 complaint. In some embodiments, I/O interface 204 may also include or be coupled to an ISO 14443 compliant contactless communication interface having one or more RF transceivers to interact with, for example, a contactless card reader. Communications between an external device such as a card reader and integrated circuit chip card 200 can be carried out using application protocol data unit (APDU) commands sent from the external device to integrated circuit chip card 200 via I/O interface 204, and using APDU responses sent from integrated circuit chip card 200 to the external device via I/O interface 204. The APDU commands from the external device can be interpreted by APDU interface 212 to allow the external device to interact and exchange data with one or more applications 252-1 to 252-n. The (I/O) interface can comprise a plurality of physical ports (e.g., contact chip, RF transceiver, etc.).

APDU interface 212 can include an interface capable of interpreting APDU commands (e.g., APDU commands received from an external device such as a client device). APDU interface 212 can interpret APDU commands in any suitable manner. APDU interface 212 can determine that an APDU command is a request for access data. For example, APDU interface 212 can analyze a tag and/or header of the received data to interpret the APDU command. APDU interface 212 can interpret any suitable APDU command tag as described herein in further detail.

To provide support for socket communication, integrated circuit chip card 200 may include network interface 220 implementing a plurality of logical ports 222-1 to 222-n. When communicating in a socket mode of communication, network interface 220 can be configured to establish multiple communication channels between the external device and integrated circuit chip card 200 using the logical ports 222-1 to 222-n. For example, each of the communication channels may support communication with one, or more, of the plurality of applications 252-1 to 252-n. A data stream from the external device, via I/O interface 204, may include a destination port number to identify which logical port the command and/or data is intended to reach. In some embodiments, each logical port can be mapped to a different application 252-1 to 252-n. This can be advantageous over a conventional integrated circuit chip card, in that multiple communication channels can be maintained with the multiple applications installed on integrated circuit chip card 200.

In some embodiments, network interface 220 may include port state buffer 225 to store the state of each logical port such that APDU commands and responses on multiple logical ports can be multiplexed on the same data stream. In some embodiments, data received by and transmitted from network interface 220 can be stored in port state buffer 225. In some embodiments, network interface 220 can be configurable to use multiple communication modes or protocols to communicate with an external device, and each logical port can be independently configured. For example, a mode selector 226 can be used to select between different communication modes and/or protocols dependent on which logical port is actively transmitting data.

II. Type of Messages

Additional details of the communication and data exchange that can be carried out using the socket mode of communication are described below.

In some embodiments, each server (e.g., each integrated circuit chip card) can be capable of one or more connections at a given time and can listen for a connection on any of the logical ports. The information sent from and received on the socket may not always relate to information that will be sent to, or received from, a specific application. To accomplish this, a method to differentiate between card data and management data can be used. In some embodiments, card management functions can be implemented using a one byte field (e.g., a management tag) and any APDU data sent to, or received from, a smart card can be implemented using at least two bytes. As such, the number of bytes passed to or received from the socket can be used to determine they type of data flowing over the socket. For this reason, in some embodiments, the client device or server device can place the exact number of bytes on the socket and not a general purpose buffer with a default length.

In some embodiments, management commands can be transmitted on a different logical port than the APDU data. In such embodiments, rather than relying on the number of bytes sent to differentiate between management data and APDU data, the port number of the logical port used during the transmission can be used to determine what type of data is being transmitted. In some embodiments, personalization data can also be sent on a separate logical port. Personalization data can include, for example, user identity information, issuer identity, recent payment history, PIN values, key material, etc.

It should be noted that in some embodiments, it can be the responsibility of the server (e.g., the integrated circuit chip card) to ensure that a two byte status word is returned to the client device that initiated the APDU. A status word can indicate a status of a sending device to a receiving device. Also, regardless of which protocol is being used to transmit APDU commands, it can be the server device's responsibility to manage the acknowledge byte (ACK) (e.g., the ACK may not be returned to the client device). In some embodiments, where the server device is an integrated circuit chip card, the client device can verify that the integrated circuit chip card is powered on and that the card functions are reset before transmitting APDU commands/data to the server device. In some embodiments, for every message initiated on the socket, whether it be a management function or command data, a response of some type can be expected by the other device.

If the length of data received on a socket is one byte, the client device or server device may determine that a management function of some sort is to be performed. As the size of the tag is one byte, it can range from 0x00 to 0xFF. The client device and/or the server device can determine if a particular tag can be managed or has been implemented by the device. If a tag is not recognized or supported, an error can be sent back to the socket informing the socket entity that initiated the tag (e.g., the client device or the server device), that the management function cannot be performed. If the management function was performed correctly, a positive acknowledgment can be sent back to the socket entity that initiated the tag.

A. Client/Server Management

In some embodiments, the tags depicted in table 1 can be used to provide information and/or instructions over the socket to either the client or the server.

TABLE 1

Client/server management tags

| Tag | Description |
| --- | --- |
| 20 | Management function correctly performed |
| E0 | Unable to perform management function |
| 80 | Instruct the server not to manage the protocol |
| 81 | Instruct the server to manage the protocol |

If the client device or server device receives, over the socket, a tag that is either (1) not recognizable, (2) has not been implemented, or (3) was not processed in a normal manner, then the client device or server device that initiated the management function can be informed of this by the other device. This can be achieved, for example, with a general purpose error tag (e.g., 0xE0). An example of where this would be beneficial is if the client device sent a management function to a socket at the server device requesting that an integrated circuit chip card (e.g., the server device) be powered off, but the integrated circuit chip card may be a simulation of a card running on the server device, and as such cannot be powered off. The server can respond with a tag of 0xE0 to the socket of the client device. In some embodiments, the tag can be extended to four bytes to become a regular APDU header where the combination of class (CLA) byte, instruction (INS) byte, and P1/P2 could inform the server what type of command (management or others) is issued by the client. The P1/P2 bytes can be Instruction parameters for the command (e.g. offset into file at which to write the data).

To prevent both the server device and the client device from placing data on the socket, each device in the system can be configured to expect a response. This can be achieved with a general purpose acknowledgment tag (e.g., 0 x20). An example of this can include the client device requesting that the integrated circuit chip card (e.g., the server device) be injected (e.g., via a tag of 0x45). The client device can then wait for a positive acknowledgment (e.g., 0x20 or 0x21) from the server prior to further requests (e.g., requesting that the card be powered on and reset, etc.).

In some embodiments, tags 0x80 and 0x81 can be used by the client device to instruct the server device whether or not to manage the protocol when the server device is communicating with an integrated circuit chip card in the byte transmission mode. As an example, this can relates to the 61xx and 6Cxx Status Words typically received from block transmission mode card, as known to one of skill in the art. If the server device was managing these Status Words, the client device would not be aware of them because the server device would either re-issue the command to the card with the correct length (6Cxx) or issue a Get Response Command to the card with the length in SW2 (61xx). In some embodiments, the default for any server device is always to manage the protocol unless otherwise instructed by the client device.

B. Reader Management

The following tags and/or headers illustrated in table 2 can be used by the client device in order to manage the card reader. The tags and/or headers can apply to different types of client devices (e.g., card readers) with a variety of functions (e.g., a card reader can be a mechanically motorized reader typically found in an ATM, etc.).

TABLE 2

Reader management tags

| Tag | Description |
| --- | --- |
| 40 | Power on the card (without any actual reset of the card) |
| 41 | Power off the card |
| 42 | Reset the card |
| 43 | Power on and Reset the card |
| 44 | Eject the card |
| 45 | Inject the card (without any actual power on) |
| 46 | Lock the card in place |
| 47 | Swallow the card |
| 48 | Is card present |

On a successful execution of a card reset (0x42 or 0x43), the server device may return (e.g., transmit) to the client device a positive acknowledgment (0x20) followed by an Answer-To-Reset data (two or more bytes) received from the card, whether the card is simulated or not simulated. The server device may return to the client device a the positive acknowledgment (0x20) on the successful execution of other management function, including a card power on (0x40).

C. Reader Status

The following headers illustrated in table 3 can be used by the server device to inform the client device of the state of the reader. These headers can be used instead of the general purpose 0xE0 tag to supply additional information to the client.

TABLE 3

Reader status tags

| Tag | Description |
| --- | --- |
| 21 | Card present |
| E1 | Card is not responding |
| E2 | Card is absent |
| E3 | Card has been removed |
| E4 | Protocol error |
| E5 | Parity error |

D. Socket Protocol Selection

The following management bytes, illustrated in table 4, can be sent by the client device to the server device to indicate that the client device requests to begin using a different socket protocol. The server device may respond with a positive acknowledgment (0x20) before the client device begins to use the new socket protocol. Both the client device and the server device can use the socket protocol described herein upon startup. These management bytes can be included in order to reserve a byte value to enable additional functions such as support for non-standard protocols. A server device which does not implement a particular non-standard protocol may return an error code (0xE0) when asked to use a protocol that it does not implement.

TABLE 4

Socket protocol selection tags

| Tag | Description |
| --- | --- |
| C0 | Begin using the socket protocol. |
| C1 | Begin using a different protocol. |

III. Determining APDU Command/Response

As mentioned previously, in some embodiments, the client device can place the correct number of bytes on the socket to allow the server device to differentiate APDU commands and responses from management functions. For APDU data, four different cases of commands will be described below.

The first case, referred to a case 1 command, can indicate that no command data and no response data are expected. The first case can include the data of CLA, INS, P1, and P2. Four bytes on the socket denotes a Case 1 APDU command. CLA can be an instruction class which can indicate the type of command (e.g., inter-industry or proprietary). INS can be instruction code which can indicate a specific command (e.g., write data, etc.). P1 and P2 can be instruction parameters for the command (e.g., offset into file at which to write the data).

The second case, referred to a case 2 command, can indicate that no command data is expected, and that Le bytes of response data are expected. The second case can include the data of CLA, INS, P1, P2, and Le. Five bytes on the socket denotes a Case 2 APDU command. Le (length of expected bytes) can encode the maximum number ($N_e$) of response bytes expected. As an illustrative example, 0 bytes can denotes $N_e$=0, whereas 1 byte in the range 1 to 255 can denote that value of $N_e$, or 0 denotes $N_e$=256. Further, 2 bytes (if extended Lc (length of command bytes) was present in the command) in the range 1 to 65 535 can denote $N_e$ of that value, or two zero bytes denotes 65 536. 3 bytes (if Lc was not present in the command), the first of which can be 0, can denote $N_e$ in the same way as two-byte Le.

The third case, referred to a case 3 command, can indicate that command data of Lc bytes is expected and that no response data is expected. The third case can include the data of CLA, INS, P1, P2, Lc, and Data. Data can include $N_c$ bytes of any suitable data. Lc can encode the number ($N_c$) of bytes of command data to follow. As an illustrative example, 0 bytes can denote $N_c$=0, whereas 1 byte with a value from 1 to 255 can denote No with the same value. 3 bytes, the first of which can be 0, can denotes $N_c$ in the range 1 to 65 535 (all three bytes may not be zero).

If six bytes are placed on the socket, this could be one of 2 cases: 1) if the value of Lc (the fifth byte) is '01' then the APDU can be a case 3 APDU command with one byte of command data; and 2) if the value of Lc (the fifth byte) is '00' then the APDU can be a case 4 APDU command with no command data.

If 7 to 231 bytes are placed on the socket, then a method similar described above can be used to determine the case. If 7 to 231 bytes are place on the socket, then 1) if the difference between the number of bytes placed on the socket and Lc is equal to 5, then the APDU can be a case 3 APDU command; or 2) if the difference between the number of bytes placed on the socket and Lc is equal to 6, then the APDU can be a case 4 APDU command.

The fourth case, referred to a case 4 command, can indicate that command data of Lc bytes and Le bytes of response data are expected. The fourth case can include the data of CLA, INS, P1, P2, Lc, Data, and Le.

In some embodiments, command data being placed on the socket can vary in the range of 4 and 231 bytes and can be used, by the server device, along with Lc (length of command) byte on the socket in the following manner to determine the case.

IV. Client and Server Methods

The following is a description of, in some embodiments, how to determine if management data or card data is being received on the socket. Prior to a detailed description, two example methods will be described.

A first method can include a receiving routine for the client device. The client device can perform the following steps 1-9:

1. Listen on socket.
2. Determine how many bytes exist on socket.
3. If only one byte exists, perform management functions and then return back to step 1.
4. Read in bytes.
5. Last 2 bytes read become SW1 & SW2.
6. Any bytes preceding SW1 & SW2 can be data received from the server device (e.g., an integrated circuit chip card).
7. Manage response data.
8. Perform any additional processing.
9. Return back to step 1.

A second method can include a receiving routine for the server device. The server device can perform the following steps 1-17:
1. Listen on socket.
2. Determine how many bytes exist on socket.
3. If only one byte exists, perform management functions and then return back to step 1.
4. Read in bytes.
5. First byte read becomes the class (CLA).
6. Second byte read becomes the instruction (INS).
7 Third byte read becomes parameter 1 (P1).
8. Fourth byte read becomes parameter 2 (P2).
9. If no more bytes, determine that this is a case 1 command, then continue with step 15.
10. Fifth byte read is length (P3).
11. If no more bytes, length is Le and determine that this is a case 2 command, then continue with step 15.
12. As more bytes exist, length is Lc.
13. If the difference between the initial number of bytes on the socket and Lc is 5, then determine that this is a case 3 command. The following bytes read can be data to be sent to the card. Then, continue with step 15.
14. If the difference between the initial number of bytes on the socket and Lc is 6, then determine that this is a case 4 command. The last byte read is Le and all bytes between Lc and Le can be data to be sent to the card.
15. Manage command data (e.g., send command and/or data to card, get response, etc.).
16. Perform any additional processing.
17. Return back to step 1.

Figure 3:
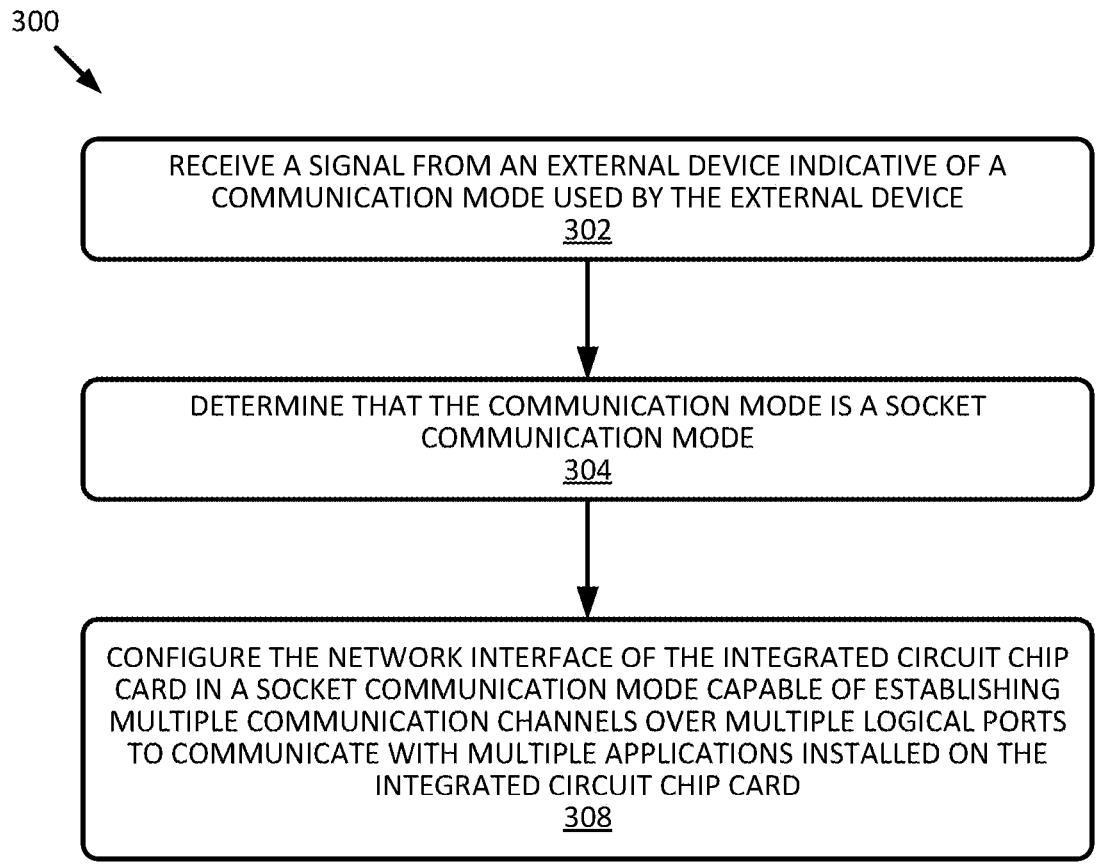
FIG. 3 illustrates a flow diagram of an integrated circuit chip card communication process, according to some embodiments.

FIG. 3 illustrates a flow diagram of a process 300 that can be used for communication with an integrated circuit chip card, according to some embodiments. Process 300 can be performed by an integrated circuit chip card, and may begin at block 302 by receiving a signal from an external device indicative of a communication mode used by the external device. In some embodiments, the signal is implemented as a tag field in a header of a data packet, as described herein.

The external device can be an access device. For example, the external device can be one of a card reader, a point-of-sale terminal, a computer, or a mobile device. The integrated circuit chip card can receive the signal during an interaction between a resource provider and a user of the integrated circuit chip card. For example, the user may initiate a payment transaction with the resource provider to gain access to a resource. In some embodiments, the integrated circuit chip card can be ISO 7816 or ISO 14443 complaint.

At block 304, after receiving the signal, a determination can be made that the communication mode is a socket communication mode. The integrated circuit chip card can determine that the communication mode is a socket communication mode based on any suitable tags and/or headers included in the signal. For example, the signal can be implemented as a tag field in a header of a data packet. Upon receiving the tag field in a header of a data packet, the integrated circuit chip card can analyze the contents of the tag field. For example, if the tag field is "CO," then the integrated circuit chip card can determine that the communication mode is a socket communication mode.

In some embodiments, the integrated circuit chip card can receive data from the external device via a first logical port of the socket. The data can be, for example, included with the signal. The integrated circuit chip card can then determine whether the data is management data or card data based on a number of bytes of the data received at the first logical port, as described herein.

At block 306, process 300 may configure the network interface of the integrated circuit chip card in a socket communication mode capable of establishing multiple communication channels over multiple logical ports to communicate with multiple applications installed on the integrated circuit chip card. In some embodiments, the signal indicative of the communication mode of the external device can be implemented as a tag field in a header of a data packet. The tag field may including information about the type of communication mode the external device supports (e.g., socket mode of communication) and/or a communication protocol used by the external device. In some embodiments, the communication channels associated with the logical ports of the integrated circuit chip card may support one or more data interchange protocols such as TCP/IP, JSON, XML, or other suitable data exchange protocol.

In some embodiments, after configuring the network interface, the integrated circuit chip card can receive an application protocol data unit (APDU) command from the external device (e.g., the client device). An application protocol data unit interface of the integrated circuit chip card can then interpret the APDU command. For example, the APDU command can be a request for access data. The application protocol data unit interface can determine that the APDU command is a request for access data using any suitable tags and headers, as described herein. After interpreting the APDU command, the integrated circuit chip card can provide an APDU response to the external device. The APDU response can include any suitable data in response to the APDU request, for example, the APDU response can include response data. The APDU response can include an optional body consisting of data and a trailer with two status bytes SW1 and SW2. SW1 and SW2 combined can be the status word (SW). In some embodiments, if the status word has the value 0x9000 (SW1=0x90, SW2=0x00), the APDU command was successfully executed by the card.

In the case that the APDU command is a request for access data, then after the integrated circuit chip card interprets the APDU command, a first application of the plurality of applications installed on the integrated circuit chip card can determine access data. After determining access data, the integrated circuit chip card can provide the access data to the external device. In some embodiments, the first application can be mapped to a first logical port of the plurality of logical ports. The access data can be provided to the external device via the first logical port by the integrated circuit chip card.

In other embodiments, the first application can be mapped to the first logical port and a second logical port of the plurality of logical ports. The first logical port can use a different communication protocol than the second logical port for communicating with the external device (e.g., the client device).

In some embodiments, a first plurality of applications on the integrated circuit chip card can communicate in parallel with a second plurality of applications on the client device via a plurality of logical ports. For example, a transit application on the integrated circuit chip card can communicate with a transit verification application on the client device (e.g., transit access terminal) via a first logical port. Concurrently, an identification application on the integrated circuit chip card can communicate with an identification verification application on the transit access terminal via a second logical port. The transit access terminal can determine that the integrated circuit chip card is registered to a user who is authorized to access the transit center, bus, etc. using the identification application. The transit access terminal can also determine that the user has funds to access the transit center, bus, etc. using the transit application and requesting authorization from an authorizing entity computer, as further described in FIG. 4.

Figure 4:
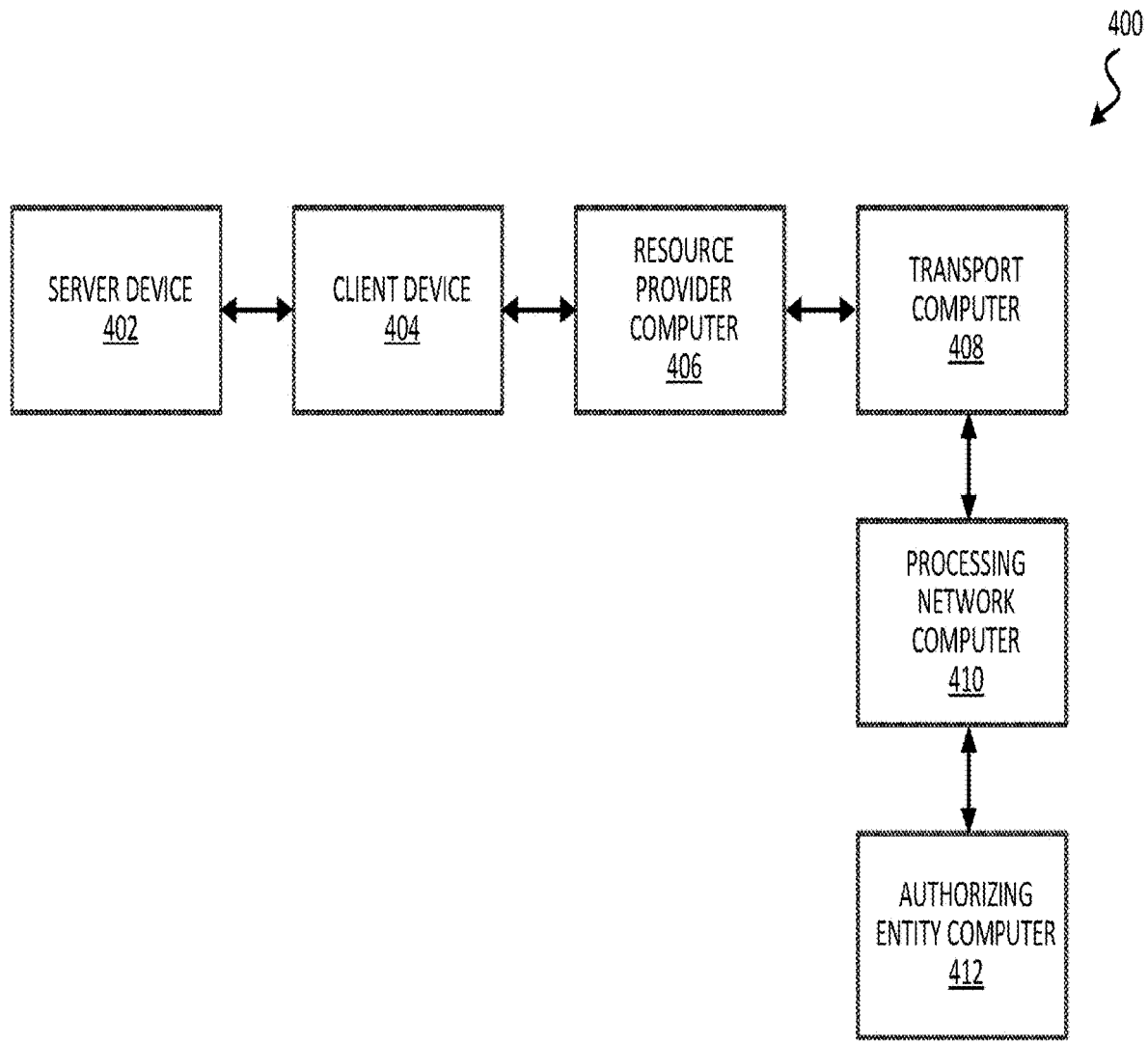
FIG. 4 illustrates a block diagram of a system, according to some embodiments.

FIG. 4 shows a system 400 according to an embodiment of the invention. The system 400 comprises server device 402, client device 404, resource provider computer 406, transport computer 408, processing network computer 410, and authorizing entity computer 412. The server device 402 can be in operative communication with the client device 404. The client device 404 can be in operative communication with the resource provider computer 406, which can be in operative communication with the transport computer 408. The transport computer 408 can be in operative communication with the processing network computer 410. The processing network computer 410 can be in operative communication with the authorizing entity computer 412.

For simplicity of illustration, a certain number of components are shown in FIG. 4. It is understood, however, that embodiments of the invention may include more than one of each component. In addition, some embodiments of the invention may include fewer than or greater than all of the components shown in FIG. 4.

Messages between at least the devices in FIG. 4 can be transmitted using a secure communications protocols such as, but not limited to, File Transfer Protocol (FTP); Hyper-Text Transfer Protocol (HTTP); Secure Hypertext Transfer Protocol (HTTPS), SSL, ISO (e.g., ISO 8583) and/or the like. The communications network that may reside between the devices may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

Server device 402 can include an integrated circuit chip card, as described in detail here. Client device 404 can include an access device as described herein. Resource provider computer 406 can include a computer operated by the resource provider. In some embodiments, resource provider computer 406 can be operatively coupled to client device 404.

Transport computer 408 be located between (in an operational sense) client device 404, or resource provider computer 406, and processing network computer 410. Transport computer 408 may be operated by an entity such as an acquirer. An acquirer can maintain an account of any merchants (e.g., an airline) with which users may wish to interact.

Processing network computer 410 may route or switch messages between a number of transport computers including transport computer 408, and a number of authorizing entity computers including authorizing entity computer 412. Processing network computer 410 may be configured to provide authorization services, and clearing and settlement services for payment transactions. Processing network computer 410 may include data processing subsystems, networks, and operations used to support and deliver authorization services, exception file services, and clearing and settlement services. In some embodiments, processing network computer 410 can be a payment processing network. An exemplary payment processing network may include VisaNet™. Payment processing networks such as VisaNet™ are able to process credit card transactions, debit card transactions, and other types of commercial transactions. VisaNet™, in particular includes a Visa Integrated Payments (VIP) system which processes authorization requests and a Base II system which performs clearing and settlement services. Furthermore, payment processing network may include a server computer and may use any suitable wired or wireless telecommunications network, including the Internet. In some embodiments, processing network computer 410 may forward an authorization request received from a transport computer to the authorizing entity computer via a communication channel. The processing network computer may further forward an authorization response message received from the authorizing entity computer to the transport computer.

The authorizing entity computer 412 may be configured to authorize any suitable request, including access to data, access to a location, or approval for a payment. In some embodiments, the authorizing entity computer 412 may be operated by an account issuer. Typically, the issuer is an entity (e.g., a bank) that issues and maintains an account of a user. The account may be a credit, debit, prepaid, or any other type of account.

In some embodiments, the integrated circuit chip card may include access data (e.g., an account number). The access data may comprise a 15 to 19 digit number. In some embodiments, the access data may be allocated in accordance with International Standards Organization (ISO) standard 7812. In this standard, the leading six digits of the access data number may be an "issuer identification number (IIN)", sometimes referred to as the "bank identification number (BIN)." The remaining numbers of the access data, except the last digit, may be the individual account identification number. The last digit is often a check digit (e.g., a Luhn check digit). The IIN or BIN may be used by a processing network to identify an appropriate authorization entity to which interactions (e.g., transactions) using the integrated circuit chip card should be routed.

In other embodiments, the integrated circuit chip card may include an expiration date that indicates a period of validity of the integrated circuit chip card. The expiration date can indicate a date after which the integrated circuit chip card is no longer valid. In some cases, the user may be required to provide the expiration date to complete a transaction. In the event that the user provides an incorrect expiration date, the transaction may be declined. For example, credit card transactions conducted online or over the phone will often require that the user provide the correct expiration date in order to verify that the user is actually in possession of the credit card. These transactions may be declined if the user is not able to provide the correct expiration date.

The integrated circuit chip card may include an account holder name that indicates a user or other entity with which the integrated circuit chip card is associated. An authorization entity may maintain an account for the account holder indicated in the account holder name. In some embodiments, a transaction may be declined if a name given in association with the account does not match the indicated account holder name.

The integrated circuit chip card may include a processing network indicator that indicates a transaction processing network used to route authorization requests associated with the integrated circuit chip card. In some embodiments, resource providers may accept integrated circuit chip cards associated with certain processing networks. For example, some merchants may only accept integrated circuit chip cards associated with Visa.

In yet other embodiments, the integrated circuit chip card may include a magnetic strip. The magnetic strip may include up to three tracks, known as track 1, track 2, and track 3. In some embodiments, only track 1 and track 2 are used. The minimum cardholder account information needed to complete a transaction is present on both tracks. Track 1 has a bit density of 210 bits per inch and is the only track that may contain alphabetic text, and hence is the only track that contains the cardholder's name. Track 2 has a bit density of 75 bits per inch.

In some embodiments, the integrated circuit chip card may include a security code. A security code may be a CVV, CVV2, CVC, CSC, CID, or any other suitable security code. In security code can be of any suitable length (e.g., 2, 3, 4, etc. digits). The security code is used to verify that a user is in possession of a valid integrated circuit chip card.

During an interaction between a user of server device 402 (e.g., integrated circuit chip card) and a resource provider of resource provider computer 406, the server device 402 can provide the access data to client device 404. Client device 404 can generate an authorization request message. The authorization request message can comprise the access data. After generating the authorization request message, client device 404 can transmit the authorization request message to resource provider computer 406. In some embodiments, client device 404 can transmit the authorization request message to transport computer 408.

After receiving the authorization request message, resource provider computer 406 can transmit the authorization request message to processing network computer 410, which can forward the authorization request message to authorizing entity computer 412.

Upon receiving the authorization request message, authorizing entity computer 412 can determine whether or not the authorize the interaction (e.g., the transaction) between the user and the resource provider. After determining whether or not to authorize the interaction, authorizing entity computer 412 can generate an authorization response message and can then transmit the authorization response message to processing network computer 410.

After receiving the authorization response message, processing network computer 410 can forward the authorization response message to transport computer 408 which can then forward the authorization response message to resource provider computer 406 and/or client device 404. After receiving the authorization response message, client device 404 can notify the user of the server device 402 of whether or not the interaction is authorized.

Embodiments of the present disclosure have a number of advantages. For example, embodiments allow for a server device (e.g., an integrated circuit chip card) to communicate via one or more logical ports to a client device (e.g., an access device). For example, the integrated circuit chip card can communicate via the one or more logical ports mapped to one or more applications. The applications can be performed/run in parallel with one another and may communicate via the mapped logical ports with the client device, rather than one application of the integrated circuit chip card communicating with the access device at a time. Another advantage is that the client device and server device can perform faster interactions, since applications can communicate in parallel between the client device and server device. Opposed to waiting for one application to finish process before running the next application.

A computer system that may be used to implement at least some of the entities or components described herein such as an external device communicating with the integrated circuit chip card. Will now be described. Subsystems in the computer system can be interconnected via a system bus. Additional subsystems include a printer, a keyboard, a fixed disk, and a monitor which can be coupled to a display adapter. Peripherals and input/output (I/O) devices, which can couple to an I/O controller, can be connected to the computer system by any number of means known in the art, such as a serial port. For example, a serial port or external interface can be used to connect the computer apparatus to a wide area network such as the Internet, a mouse input device, or a scanner. The interconnection via system bus allows the central processor to communicate with each subsystem and to control the execution of instructions from system memory or the fixed disk, as well as the exchange of information between subsystems. The system memory and/or the fixed disk may embody a computer-readable medium.

The techniques described herein may involve implementing one or more functions, processes, operations or method steps. In some embodiments, the functions, processes, operations or method steps may be implemented as a result of the execution of a set of instructions or software code by a suitably-programmed computing device, microprocessor, data processor, or the like. The set of instructions or software code may be stored in a memory or other form of data storage element which is accessed by the computing device, microprocessor, etc. In other embodiments, the functions, processes, operations or method steps may be implemented by firmware or a dedicated processor, integrated circuit, etc.

The methods and processes described herein are exemplary in nature, and the methods and processes in accordance with some embodiments may perform one or more of the steps in a different order than those described herein, include one or more additional steps not specially described, omit one or more steps, combine one or more steps into a single step, split up one or more steps into multiple steps, and/or any combination thereof.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
receiving, by an integrated circuit chip card, a signal from an external device indicative of a communication mode used by the external device;
determining, by the integrated circuit chip card, based on the signal from the external device, that the communication mode is a socket communication mode;
receiving, by the integrated circuit chip card in the socket communication mode, data from the external device;
determining, by the integrated circuit chip card in the socket communication mode, a number of bytes of the data;
determining, by the integrated circuit chip card in the socket communication mode, the data is card data solely based on the number of bytes of the data, where the data is management data when the number of bytes is one byte, and wherein the data is card data when the number of bytes is two bytes;
in response to determining that the data is card data, processing the card data to determine response data; and
transmitting, by the integrated circuit chip card in the socket communication mode, the response data to the external device.

2. The method of claim 1, further comprising:
configuring a network interface of the integrated circuit chip card in the socket communication mode to establish a plurality of communication channels between the integrated circuit chip card and the external device using a physical port of the integrated circuit chip card and a plurality of logical ports of the integrated circuit chip card.

3. The method of claim 2, wherein configuring the network interface of the integrated circuit chip card in the socket communication mode to establish the plurality of communication channels includes:
establishing a first communication channel between the external device and a first application of a plurality of applications installed on the integrated circuit chip card, the first communication channel including the physical port and a first logical port of the plurality of logical ports; and
establishing a second communication channel between the external device and a second application of the plurality of applications installed on the integrated circuit chip card, the second communication channel including the physical port and a second logical port of the plurality of logical ports.

4. The method of claim 3, wherein the data from the external device is received at the first logical port.

5. The method of claim 3, wherein establishing the first communication channel includes:
mapping the first logical port of the plurality of logical ports to the first application of the plurality of applications; and
configuring the first communication channel to use a first data interchange protocol, and
wherein establishing the second communication channel includes:
mapping the second logical port of the plurality of logical ports to the second application of the plurality of applications; and
configuring the second communication channel to use a second data interchange protocol that is different than the first data interchange protocol, wherein the first communication channel and the second communication channel both use the same physical port.

6. The method of claim 5, wherein processing the card data to determine the response data is performed by the first application of the plurality of applications, and wherein the response data is transmitted to the external device via the first logical port and using the first data interchange protocol.

7. The method of claim 6, further comprising:
before transmitting the response data, selecting the first data interchange protocol of the first communication channel.

8. The method of claim 6, wherein the first data interchange protocol is TCP/IP and the second data interchange protocol is JSON or XML.

9. The method of claim 5, further comprising:
receiving, by the integrated circuit chip card through a socket communication, from the external device, selections of the first application of the plurality of applications installed on the integrated circuit chip card, the first data interchange protocol, the second application of the plurality of applications installed on the integrated circuit chip card, and the second data interchange protocol.

10. The method of claim 5, further comprising:
switching back-and-forth between the first communication channel and the second communication channel, wherein the first application operates in parallel with the second application.

11. The method of claim 3, wherein the signal is received during an interaction between the integrated circuit chip card and the external device, wherein the first communication channel and the second communication channel are established temporarily for the interaction between the integrated circuit chip card and the external device, and wherein each of the plurality of logical ports can be dynamically mapped to any of the plurality of applications.

12. The method of claim 3, wherein the plurality of applications is a first plurality of applications, a second plurality of applications is installed on the external device, and wherein the first communication channel is between the first application of the first plurality of applications installed on the integrated circuit chip card and a corresponding third application of the second plurality of applications installed on the external device, and wherein the second communication channel is between the second application of the first plurality of applications installed on the integrated circuit chip card and a corresponding fourth application of the second plurality of applications installed on the external device.

13. The method of claim 12, wherein the first application is a transit application, the corresponding third application is a transit verification application, the second application is an identification application, and the corresponding fourth application is an identification verification application.

14. The method of claim 12, wherein the first application of the first plurality of applications installed on the integrated circuit chip card is written in a first programming language, and the corresponding third application of the second plurality of applications installed on the external device is written in a second programming language that is different than the first programming language.

15. The method of claim 1, wherein the management data is personalization data, and wherein the card data is APDU data.

16. An integrated circuit chip card comprising:
a processor;
a memory comprising code, executable by the processor, for implementing a method comprising:
   receiving a signal from an external device indicative of a communication mode used by the external device;
   determining, based on the signal from the external device, that the communication mode is a socket communication mode;
   receiving data from the external device;
   determining a number of bytes of the data;
   determining that the data is card data solely based on the number of bytes of the data, where the data is management data when the number of bytes is one byte, and wherein the data is card data when the number of bytes is two bytes;
   in response to determining that the data is card data, processing the card data to determine response data; and
   transmitting the response data to the external device.

17. The integrated circuit chip card of claim 16, where the method further comprises:
   determining, based on the signal from the external device, that the external device uses a first data interchange protocol and a second data interchange protocol.

18. The integrated circuit chip card of claim 16, wherein the signal is implemented as a tag field in a header of a data packet.

19. The integrated circuit chip card of claim 16, wherein the external device is one of a card reader, a point-of-sale terminal, a computer, or a mobile device, and wherein the integrated circuit chip card is ISO 7816 or ISO 14443 complaint.

* * * * *